United States Patent
Schoonmaker et al.

(10) Patent No.: US 12,268,124 B2
(45) Date of Patent: Apr. 8, 2025

(54) LAWN CARE VEHICLE CONTROL LEVER ADJUSTMENT ASSEMBLY

(71) Applicant: Husqvarna AB, Huskvarna (SE)

(72) Inventors: Adam Schoonmaker, Monroe, NC (US); Christopher Van Buren, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 807 days.

(21) Appl. No.: 17/613,891

(22) PCT Filed: Oct. 19, 2020

(86) PCT No.: PCT/US2020/056325
§ 371 (c)(1),
(2) Date: Nov. 23, 2021

(87) PCT Pub. No.: WO2021/183188
PCT Pub. Date: Sep. 16, 2021

(65) Prior Publication Data
US 2022/0232767 A1    Jul. 28, 2022

Related U.S. Application Data

(60) Provisional application No. 62/987,958, filed on Mar. 11, 2020.

(51) Int. Cl.
*A01D 34/82* (2006.01)
*A01D 34/66* (2006.01)
*A01D 101/00* (2006.01)

(52) U.S. Cl.
CPC .......... *A01D 34/824* (2013.01); *A01D 34/66* (2013.01); *A01D 2101/00* (2013.01)

(58) Field of Classification Search
CPC ... A01D 34/824; A01D 34/66; A01D 2101/00
See application file for complete search history.

(56) References Cited

U.S. PATENT DOCUMENTS 6,343,668 B1   2/2002   Dean
7,299,610 B2   11/2007  Piontek
(Continued)

FOREIGN PATENT DOCUMENTS

WO      2019082149 A1    5/2019

OTHER PUBLICATIONS

International Search Report and Written Opinion for International Application No. PCT/US2020/056325 mailed Feb. 1, 2021.
(Continued)

*Primary Examiner* — Jacob D Knutson
(74) *Attorney, Agent, or Firm* — Burr & Forman LLP

(57) ABSTRACT

An adjustment assembly for adjusting a position of one of a pair of steering levers of a riding lawn care vehicle that has first and second drive wheels may include a sleeve, a base portion and a rotatable adjuster. The steering levers may be operably coupled to respective ones of the first and second drive wheels to selectively control the riding lawn care vehicle based on drive speed control of the first and second drive wheels responsive to positioning of the steering levers along forward and rearward directions. The sleeve may be operably coupled to one of the steering levers and the base portion may be operably coupled to the sleeve via a pivot coupling. The pivot coupling is configured to reposition the sleeve relative to the base portion along the forward and rearward directions responsive to operation of the rotatable adjuster to define non-discrete fixing relationships between the sleeve and the base portion along the forward and rearward directions.

20 Claims, 10 Drawing Sheets

(56) References Cited

U.S. PATENT DOCUMENTS

| | | | |
|---|---|---|---|
| 7,302,789 B2* | 12/2007 | Eavenson, Sr. | A01D 34/828 56/11.8 |
| 7,458,432 B2 | 12/2008 | Mayer et al. | |
| 8,240,420 B1* | 8/2012 | Bartel | B62D 11/006 180/315 |
| 8,522,901 B1* | 9/2013 | VanLue | B62D 11/04 56/15.8 |
| 10,045,485 B2 | 8/2018 | Burns et al. | |
| 10,321,627 B1 | 6/2019 | Lapp | |
| 11,357,170 B1* | 6/2022 | Funk | B62D 11/02 |
| 11,597,275 B2* | 3/2023 | Yamada | G05G 1/04 |
| 11,787,471 B1* | 10/2023 | Probst | B60K 26/02 56/10.8 |
| 2009/0217636 A1 | 9/2009 | Loxterkamp et al. | |
| 2011/0277433 A1 | 11/2011 | Sugden et al. | |
| 2014/0262630 A1* | 9/2014 | Borshov | B60T 7/104 188/16 |

OTHER PUBLICATIONS

"How to set up a Zero Turn Mower Lap Bar Controls | Ariens IKON X Lawn Mower", Retrieved From https://www.youtube.com/watch?v=CLHbJ5Cplz8, Jul. 11, 2019, 4 Pages.
"How to Adjust IKON X Steering Lever | Ariens®", Retrieved From https://www.youtube.com/watch?v=Rp2d7yZnkP0, Dec. 20, 2018, 3 Pages.
SCAG Power Equipment, "Quick-Fit Adjustable Steering Levers", Retrieved From www.sca.com, Nov. 26, 2011, 1 Page.

* cited by examiner

LAWN CARE VEHICLE CONTROL LEVER ADJUSTMENT ASSEMBLY

TECHNICAL FIELD

Example embodiments generally relate to lawn care vehicles and, more particularly, to such vehicles that use control levers, and a lever adjustment assembly that is configured to enable fine adjustments.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some mowers have been provided with very short (e.g., near zero) turning radiuses. Such mowers have employed separate steering levers that interface with the drive wheels on each respective side of the mower.

When these separate steering levers are employed, it is common for a drive wheel on each side of the vehicle to be controlled by a corresponding lever on the same side of the vehicle. The operator therefore sits in the seat of the vehicle (or sometimes stands at an operator station), and has the steering levers disposed in a convenient location for the operator to grasp. The operator then pulls the steering levers back, or pushes them forward, in order to control the direction and magnitude of drive power to be applied to each respective wheel.

Within the context described above, it is preferable for the operator to be enabled to adjust the position of the steering levers (sometimes called "sticks") so that the neutral position of the sticks corresponds to a comfortable position for the operator. To make any necessary adjustments, conventional designs typically employ one of two different adjustment paradigms. First, there is a finite adjustment paradigm in which the steering levers can be adjusted (e.g., via a ratcheting or hole and pin style adjustment) between any of a plurality of different preconfigured locations. Each location corresponds to a separate tooth or hole position. For these designs, the preset locations of the adjustment points can make it very difficult to get the steering levers to line up properly.

A second adjustment paradigm may be referred to as an infinite slot adjustment paradigm. This design is aimed at completely eliminating the preconfigured locations, so that the steering levers can be adjusted to an infinite number of locations between the extreme ends of the adjustment range. Although offering a better chance of achieving good alignment of the steering levers in theory, this design tends to provide slip and therefore can move, even after tightening in a particular location. Moreover, imprints tend to be created within the adjustment slot, making minor adjustments very difficult to achieve.

Accordingly, it can be appreciated that there is room for improvement in relation to how steering levers are adjusted.

BRIEF SUMMARY OF SOME EXAMPLES

Some example embodiments of the present invention provide steering levers on a riding lawn care vehicle with an improved adjustment assembly that allows infinite adjustment, but does not suffer from the limitations described above. This arrangement, as will be discussed in greater detail below, tends to provide an improved operator experience during employment of the riding lawn care vehicle.

In one example embodiment, a riding lawn care vehicle is provided. The riding lawn care vehicle may include a frame to which at least a first drive wheel and a second drive wheel of the riding lawn care vehicle are attachable, a steering assembly and an adjustment assembly. The steering assembly may include a first steering lever and a second steering lever. The first and second steering levers may be operably coupled to the first and second drive wheels respectively to facilitate turning of the riding lawn care vehicle based on drive speed control of the first and second drive wheels responsive to positioning of the first and second steering levers along a first direction when the first and second steering levers are in an operating position. The adjustment assembly may provide for adjusting a position of one of the first or second steering levers. The adjustment assembly may include a sleeve operably coupled to one of the first steering lever or the second steering lever, a base portion operably coupled to the sleeve via a pivot coupling, and a rotatable adjuster. The pivot coupling may be configured to reposition the sleeve relative to the base portion along the forward and rearward directions responsive to operation of the rotatable adjuster to define non-discrete fixing relationships between the sleeve and the base portion along the forward and rearward directions.

In another example embodiment, an adjustment assembly for adjusting a position of one of a pair of steering levers of a riding lawn care vehicle that has first and second drive wheels is provided. The adjustment assembly may include a sleeve, a base portion and a rotatable adjuster. The steering levers may be operably coupled to respective ones of the first and second drive wheels to selectively control the riding lawn care vehicle based on drive speed control of the first and second drive wheels responsive to positioning of the steering levers along forward and rearward directions. The sleeve may be operably coupled to one of the steering levers and the base portion may be operably coupled to the sleeve via a pivot coupling. The pivot coupling is configured to reposition the sleeve relative to the base portion along the forward and rearward directions responsive to operation of the rotatable adjuster to define non-discrete fixing relationships between the sleeve and the base portion along the forward and rearward directions.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

Figure 9:
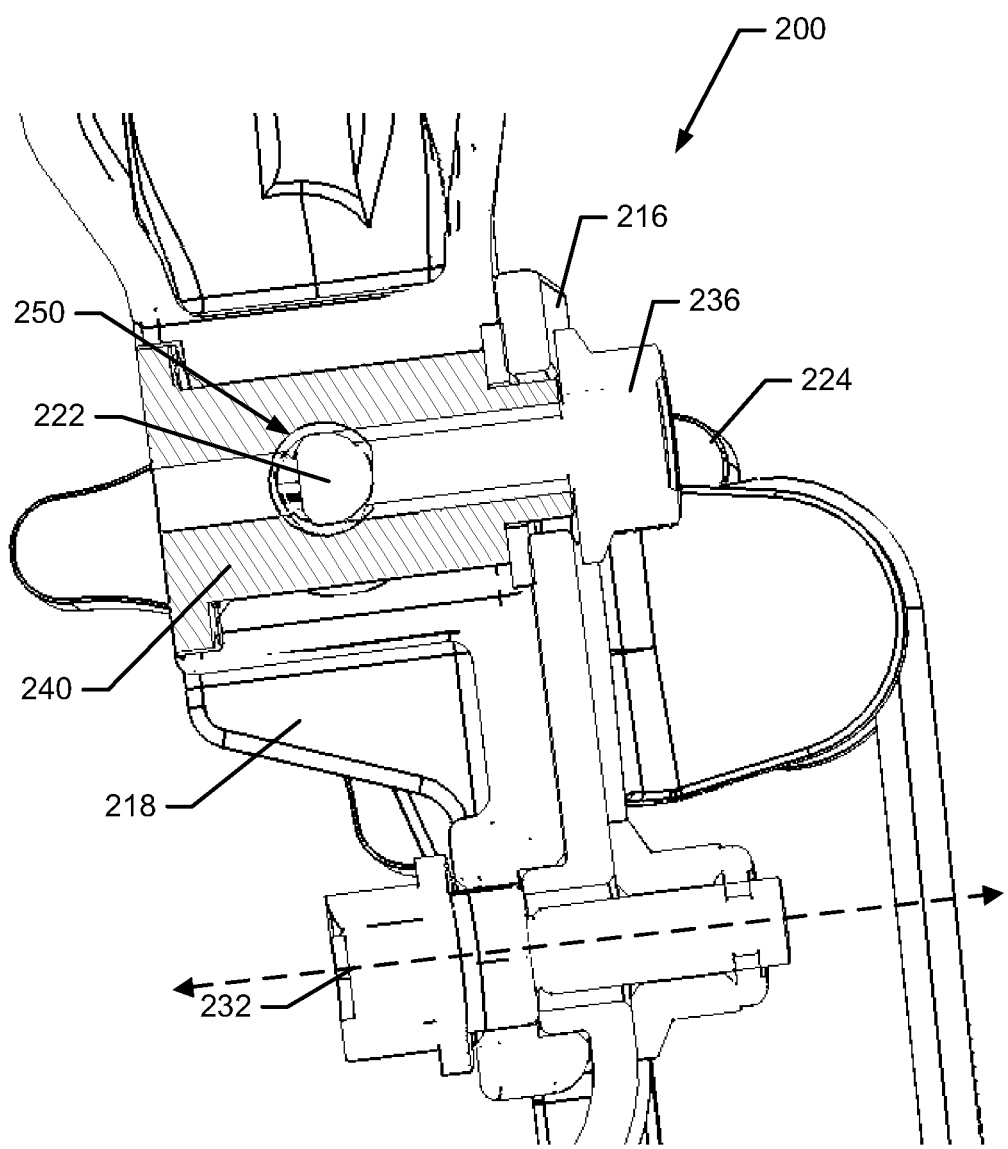
Figure 10:
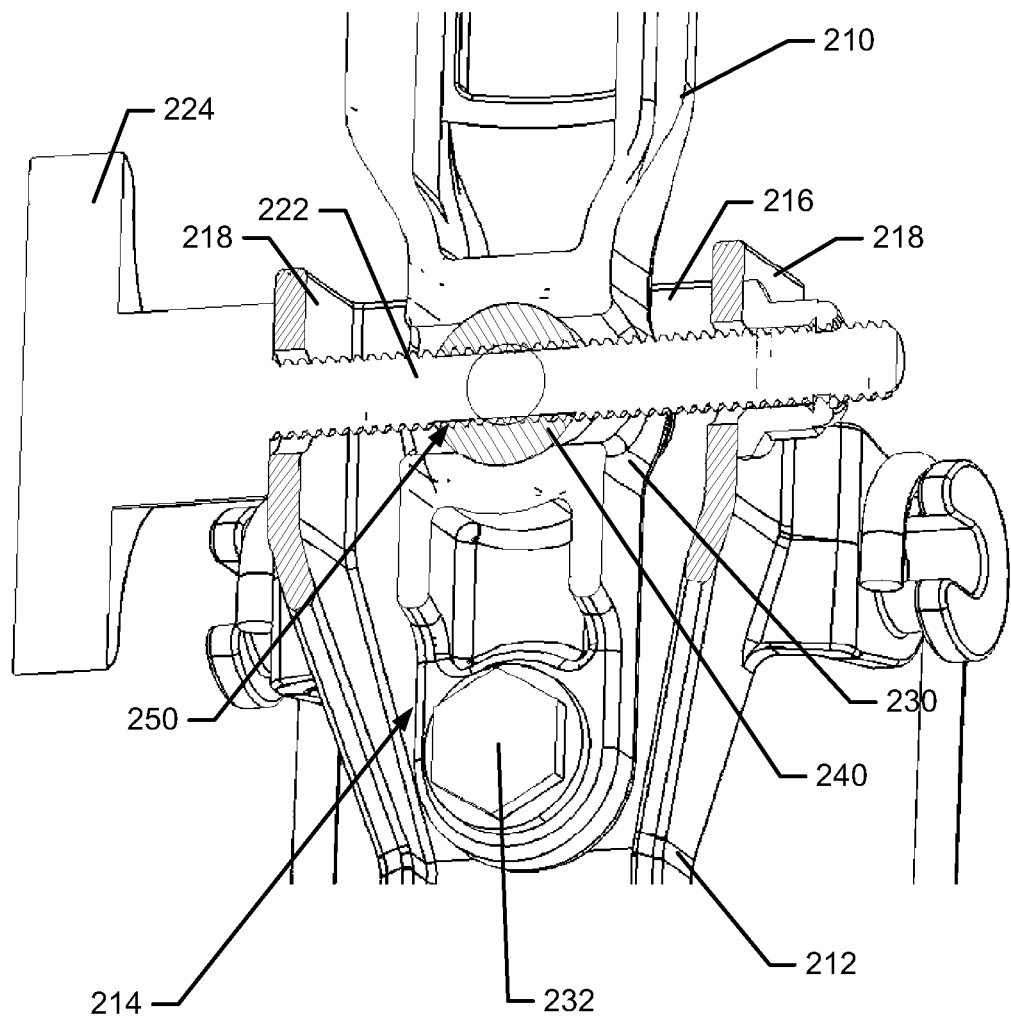

FIG. 9 is a cross section view of the adjustment assembly with a sectioning plane bisecting a pivot block of the adjustment assembly along a longitudinal axis of the pivot block in accordance with an example embodiment; and FIG. 10 is a cross section view of the adjustment assembly with a sectioning plane bisecting an adjustment channel along a longitudinal axis of the adjustment channel in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to precisely set or adjust (including fine adjustment) the position of the steering levers of lawn care vehicles such as, for example, zero-turning radius lawn mowers. This further enables the operator to get exact alignment between the right and left steering levers at the neutral position. In this regard, some example embodiments may provide a steering assembly that employs a rotatable adjuster (e.g., a lead screw) to finely set the adjustment of the control levers. A pivot block or similar structure may be provided in a center portion of a connection part of the lever mount (e.g., a tube end of a socket to which the tube can be affixed) to enable the rotatable adjuster to be turned for positioning of the steering levers. The rotatable adjuster may pass through an adjustment channel and the pivot block, and will be allowed to move up and down as the handle adjustment sweeps on an arc around the adjustment pivot location. The rotatable adjuster can employ a knob end, or some other relatively easy-to-grip structure, so that the adjustments can be made completely without tools. However, if tool use is desired, the rotatable adjuster could instead be configured to interface with a tool (e.g., having a hex head, or a slot arrangement that mates with a screw driver or other tool. Such a design may further enable the user to adjust the position of the control levers without having to loosen and/or tighten a fastener at the pivot joint of the control levers. Moreover, the design could also be amenable to modification by adding motorized or electrified operation.

Figure 1A:
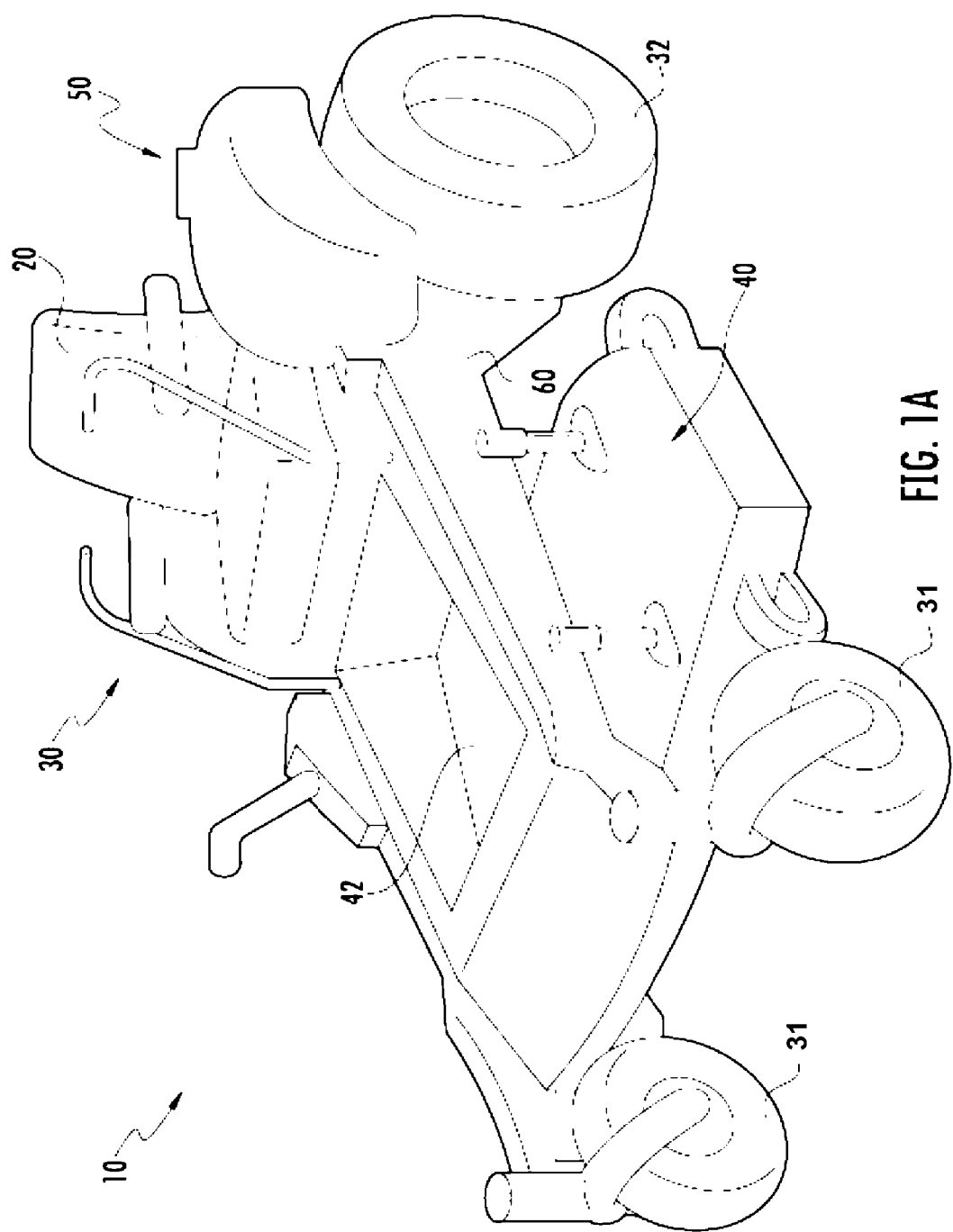
FIG. 1A illustrates a perspective view of a riding lawn care vehicle according to an example embodiment.
Figure 1B:
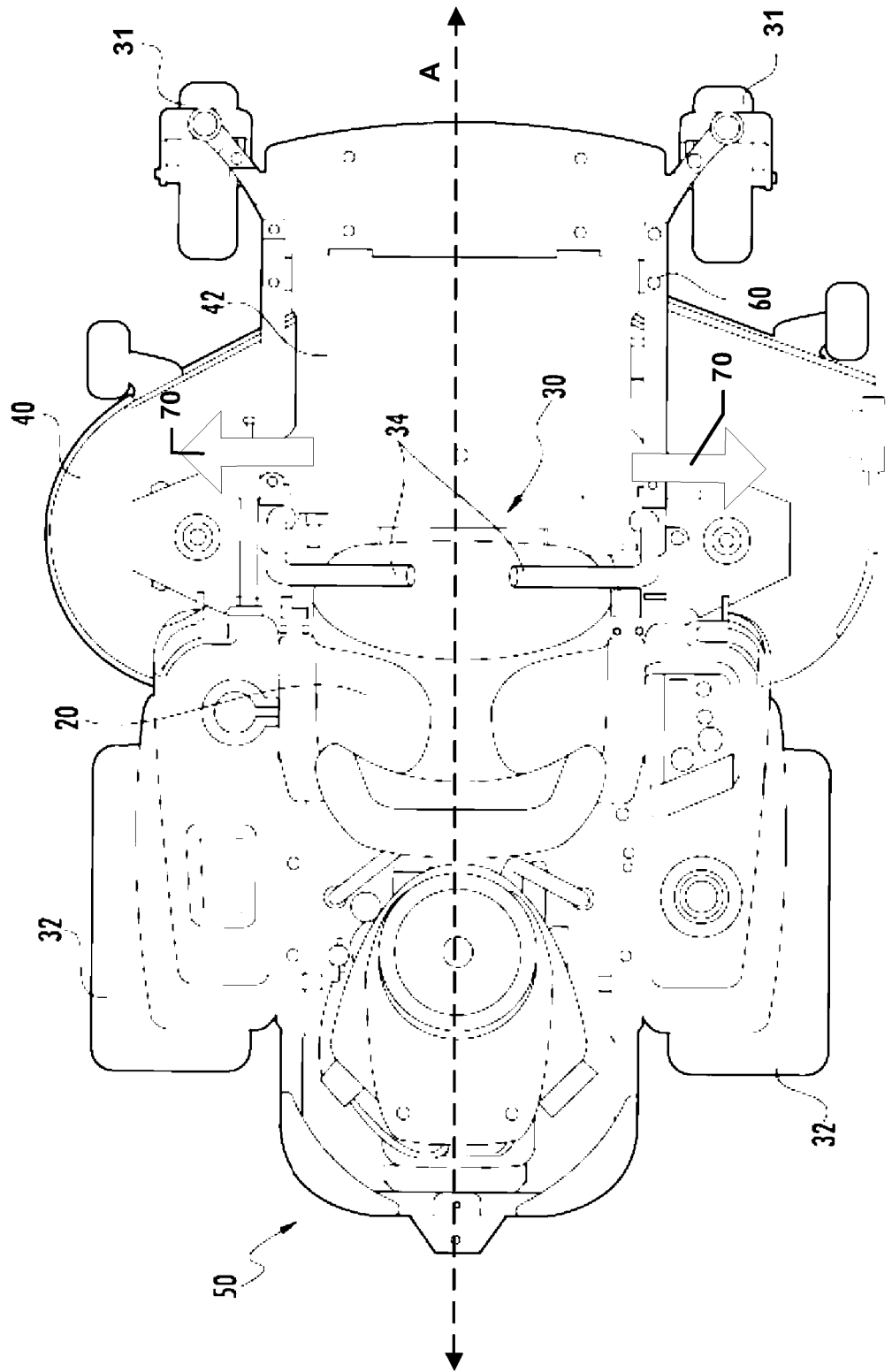
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10.

Figure 2:
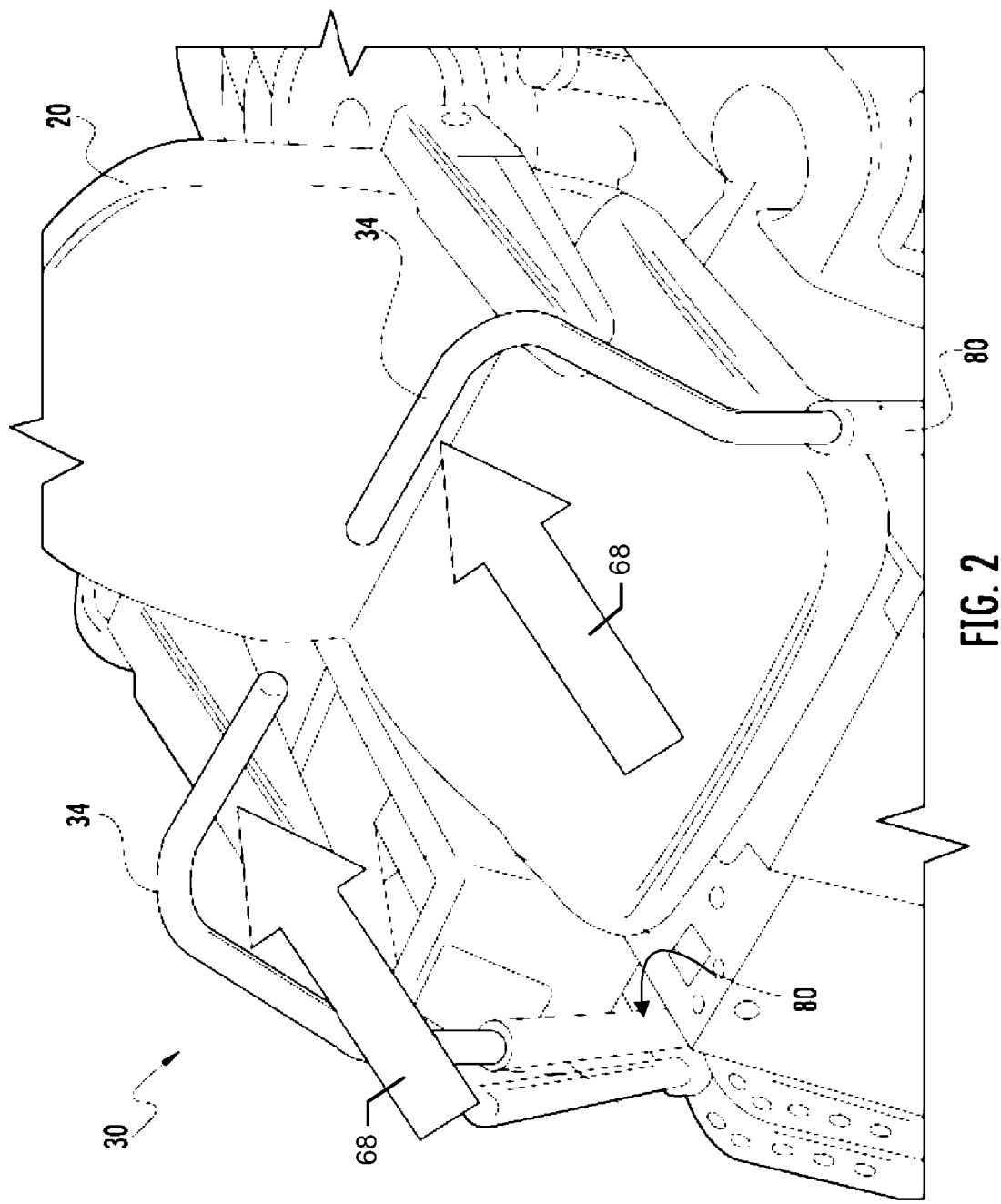
FIG. 2 illustrates a perspective view of a steering assembly with steering levers positioned to be pulled back for rearward propulsion according to an example embodiment.

FIG. 2 illustrates a perspective view of a steering assembly with steering levers positioned to be pulled back for rearward propulsion according to an example embodiment. Referring to FIGS. 1 and 2, the operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30. In an example embodiment, the steering assembly 30 may include separately operable steering levers 34 (which may be alternatively referred to as "control sticks," "control levers," or simply "sticks") shown specifically in FIG. 1B and FIG. 2.

The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. The steering levers 34 may be operable to move forward (i.e., in a direction opposite arrow 68 in FIG. 2) and rearward (i.e., in the direction shown by arrow 68 in FIG. 2) while in the inboard position (shown in both FIGS. 1 and 2).

When a steering lever 34 is pushed forward (e.g., away from the operator an opposite the direction of arrow 68), the corresponding hydraulic motor may drive the corresponding wheel forward. When a steering lever 34 is pulled rearward (e.g., toward the operator as shown by the direction of arrows 68 in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments such as, for example, electric motor control.

Although the steering levers 34 are generally moved forward (i.e., opposite the direction of the arrows 68 shown in FIG. 2) or backward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, although the steering levers 34 are shown in the inboard (or operational) position in FIGS. 1 and 2, the steering levers 34 may be moved in the direction of arrows 70 (i.e., outboard) relative to their inboard position and into a non-operational position. In some cases, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one (and sometimes both) of the steering levers 34 is pivoted outwardly, brakes may be applied and the operator may easily mount or dismount the riding lawn care vehicle 10 and sit in or leave the seat 20.

In some conventional riding lawn care vehicles, a brake lever separate and distinct from the steering assembly is provided to interface with the brake assembly of the vehicle. In others, as noted above, the steering levers 34 are moved outwardly to the outboard position, and the outward movement to the outboard position is used to operate a let of linkages or other operable coupling to set the brake assembly.

Figure 3:
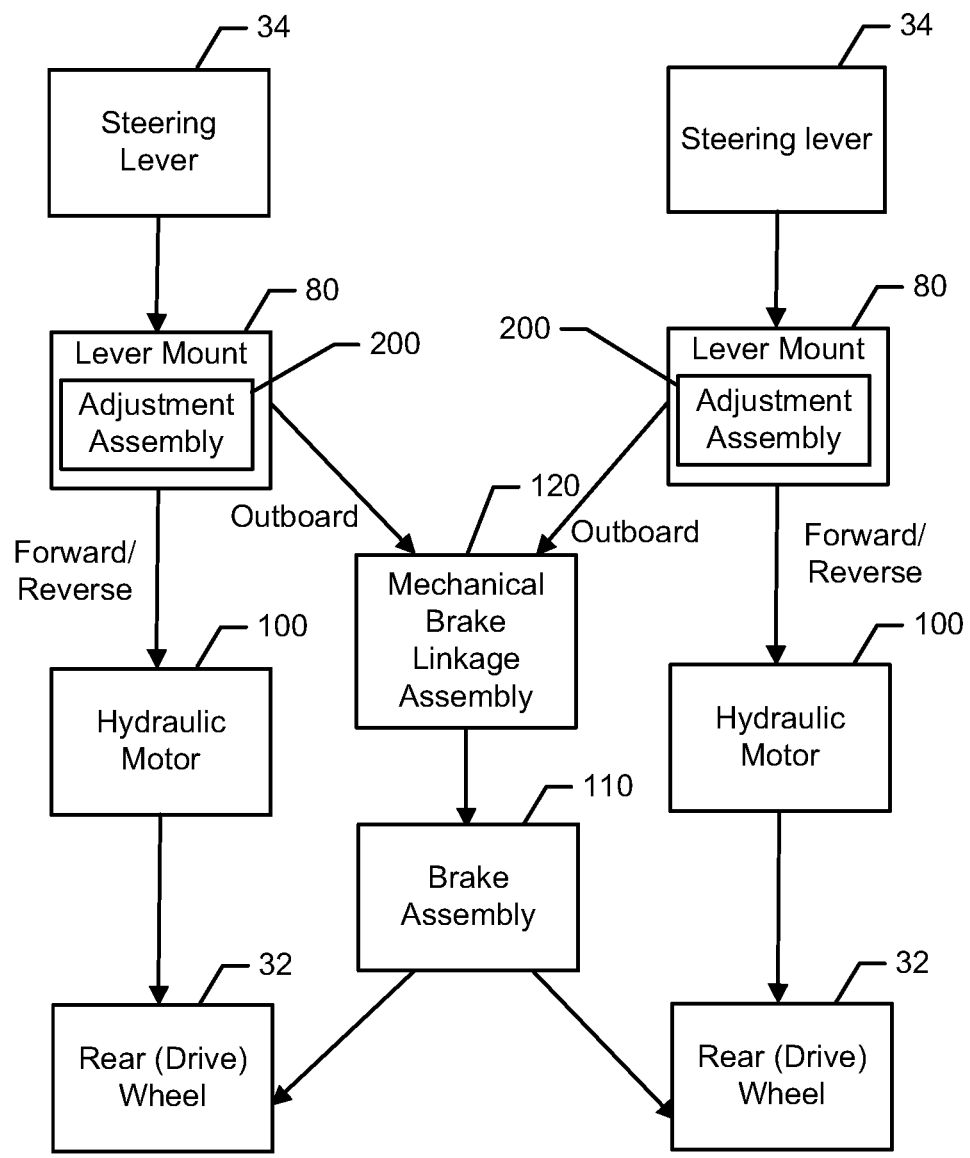
FIG. 3 illustrates a block diagram of some steering assembly components according to an example embodiment.

FIG. 3 illustrates a block diagram of some steering and braking components of an example embodiment. As shown in FIG. 3, each one of the steering levers 34 may be operably coupled to a corresponding one of the lever mounts 80. The lever mounts 80 may be operably coupled to corresponding hydraulic motors 100 that power respective ones of the drive wheels (e.g., the rear wheels 32). A brake system including a brake assembly 110 is also provided in which, for example, the brake assembly 110 is activated via outboard movement of the steering levers 34. To accomplish this, a mechanical brake linkage assembly 120 may be provided to operably coupled each respective steering lever 34 and/or lever mount 80 to the brake assembly 110 to activate brakes (electrically or mechanically) on the rear wheels 32 based on moving a position of the steering lever 34 and/or lever mount 80 to the outboard position.

As shown in FIG. 3, the mechanical brake linkage assembly 120 is provided to operably couple the lever mounts 80 to the brake assembly 110. In some cases, the mechanical brake linkage assembly 120 can be split into right side and left side linkages that are independent of each other. However, in other cases, the right and left side linkages may also be tied together so that they operate in tandem, or movement of one steering lever 34 carries the other. In either case, if the lever mount 80 on either side may be pivoted to the outboard position, the mechanical brake linkage assembly 120 may operate to activate the brake assembly 110 so that brakes are applied at the rear wheels 32.

The lever mounts 80 may further include (or be operably coupled to) an adjustment assembly 200 of an example embodiment. The adjustment assembly 200 may provide for infinite adjustment of the neutral position of the steering levers 34 (i.e., the position when no force is applied thereto in either the forward or rearward direction) between the opposing limits of a range of adjustable setpoints for the neutral position. Moreover, the adjustment assembly 200 may be configured to enable such adjustment without need for tools, and in a way that permits fine adjustments of both steering levers 34 so that the neutral positions thereof are aligned or matching.

Figure 4:
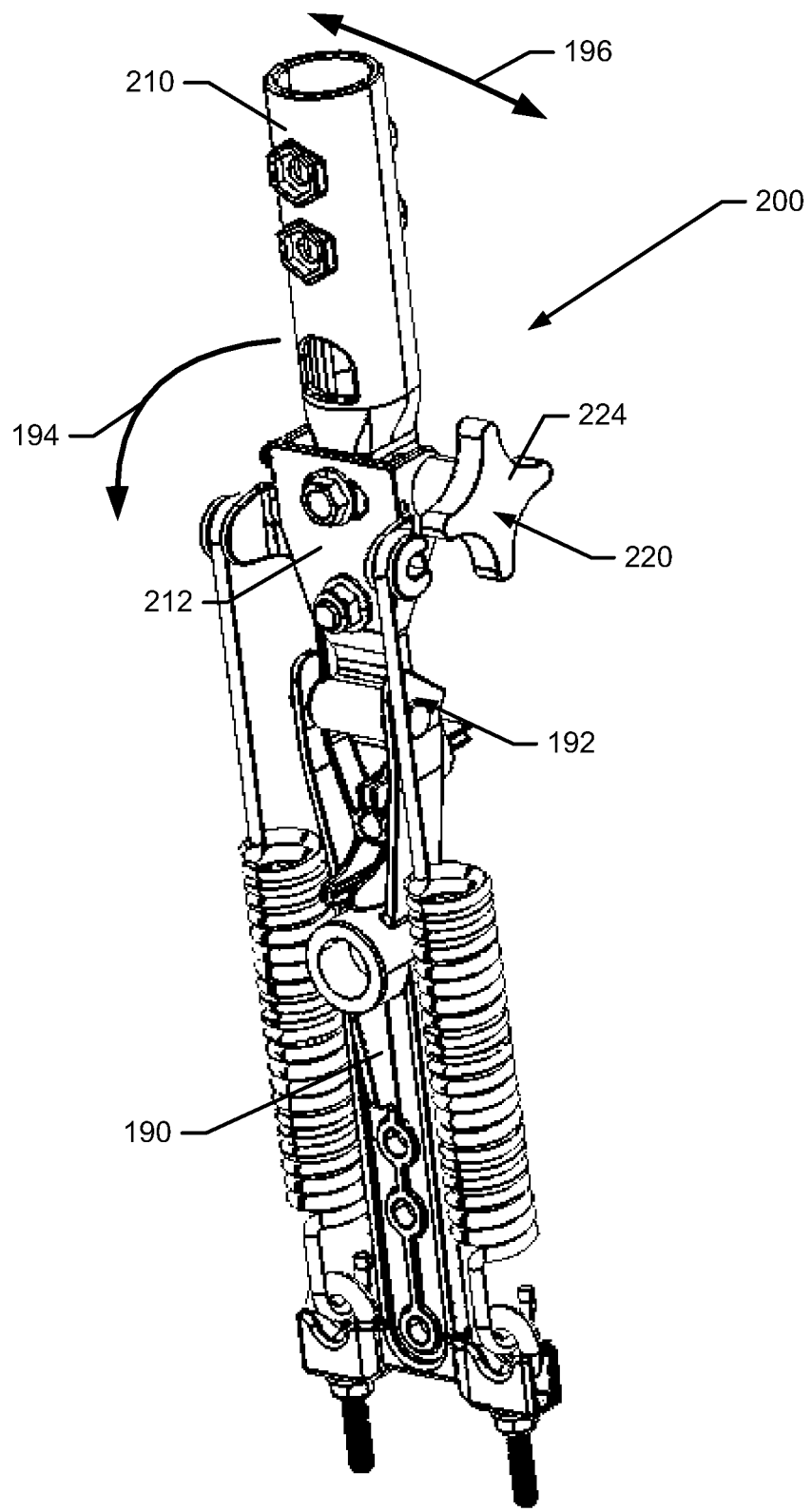
FIG. 4 illustrates a block diagram of a lever mount of a steering assembly in accordance with an example embodiment.
Figures 5, 6:
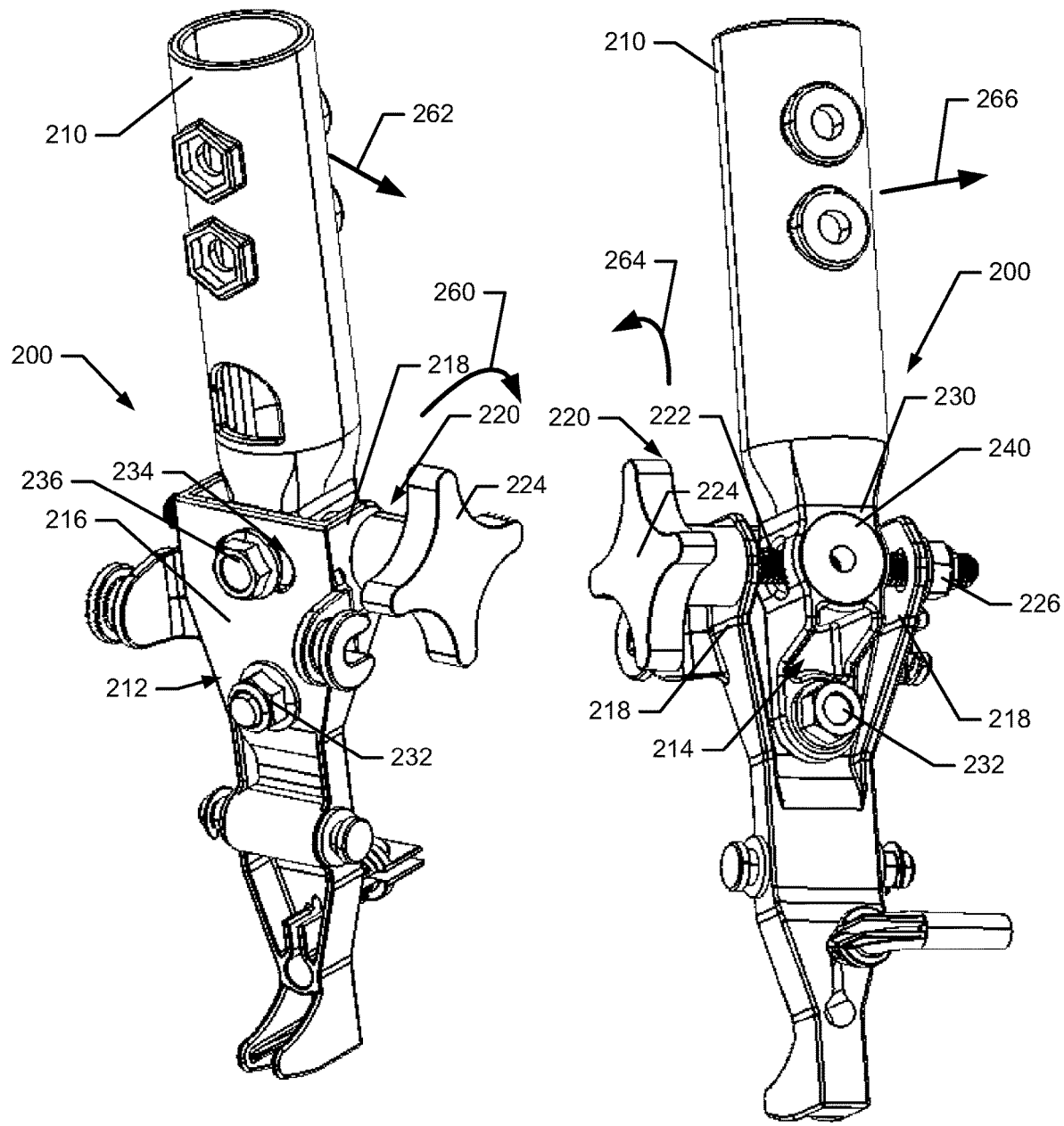
FIG. 5 illustrates a perspective view of an adjustment assembly in accordance with an example embodiment.
FIG. 6 illustrates a perspective view of the other side of the adjustment assembly of FIG. 5 in accordance with an example embodiment.
Figure 7:
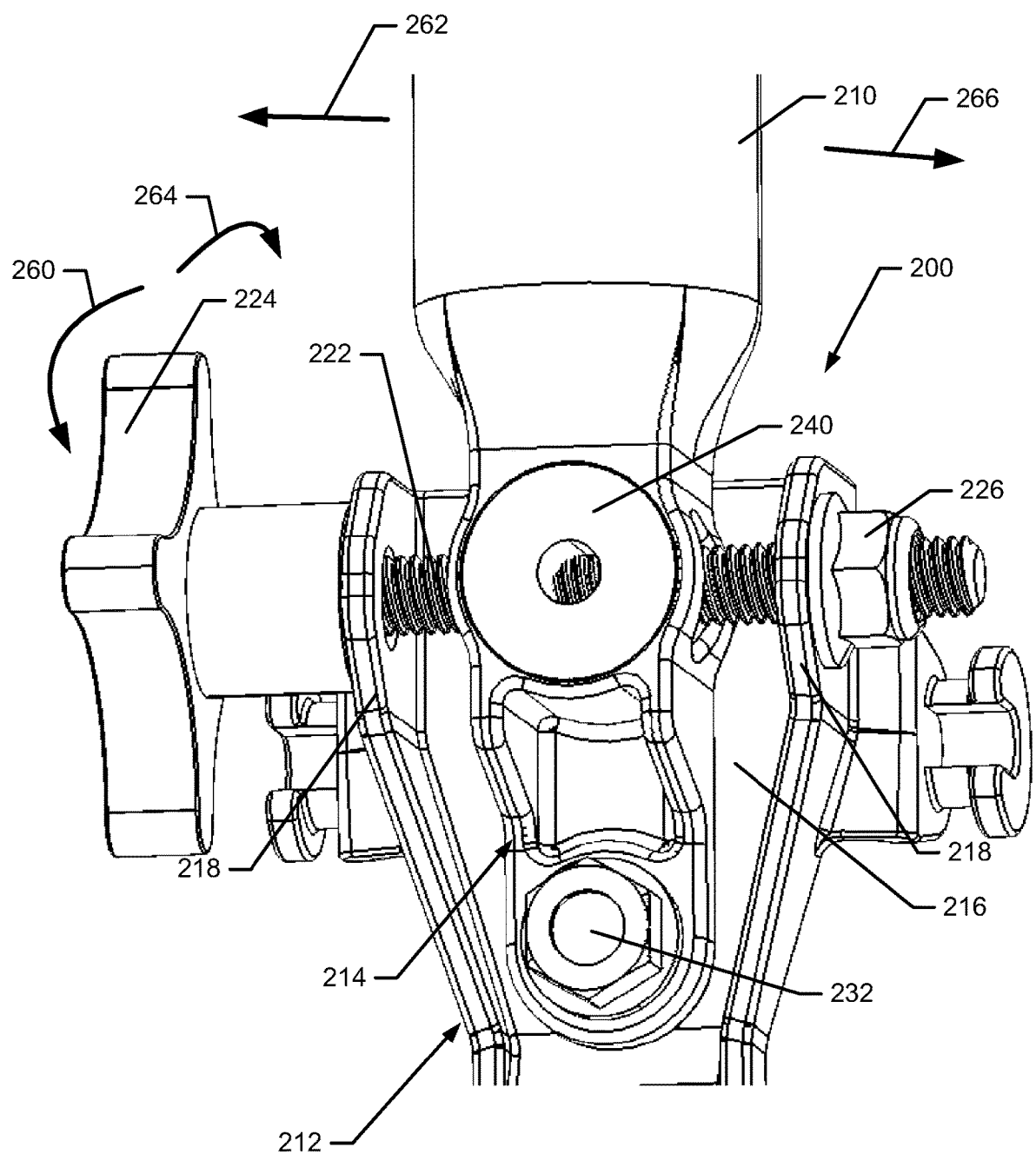
FIG. 7 is a perspective view of the adjustment assembly in greater detail in accordance with an example embodiment.
Figure 8:
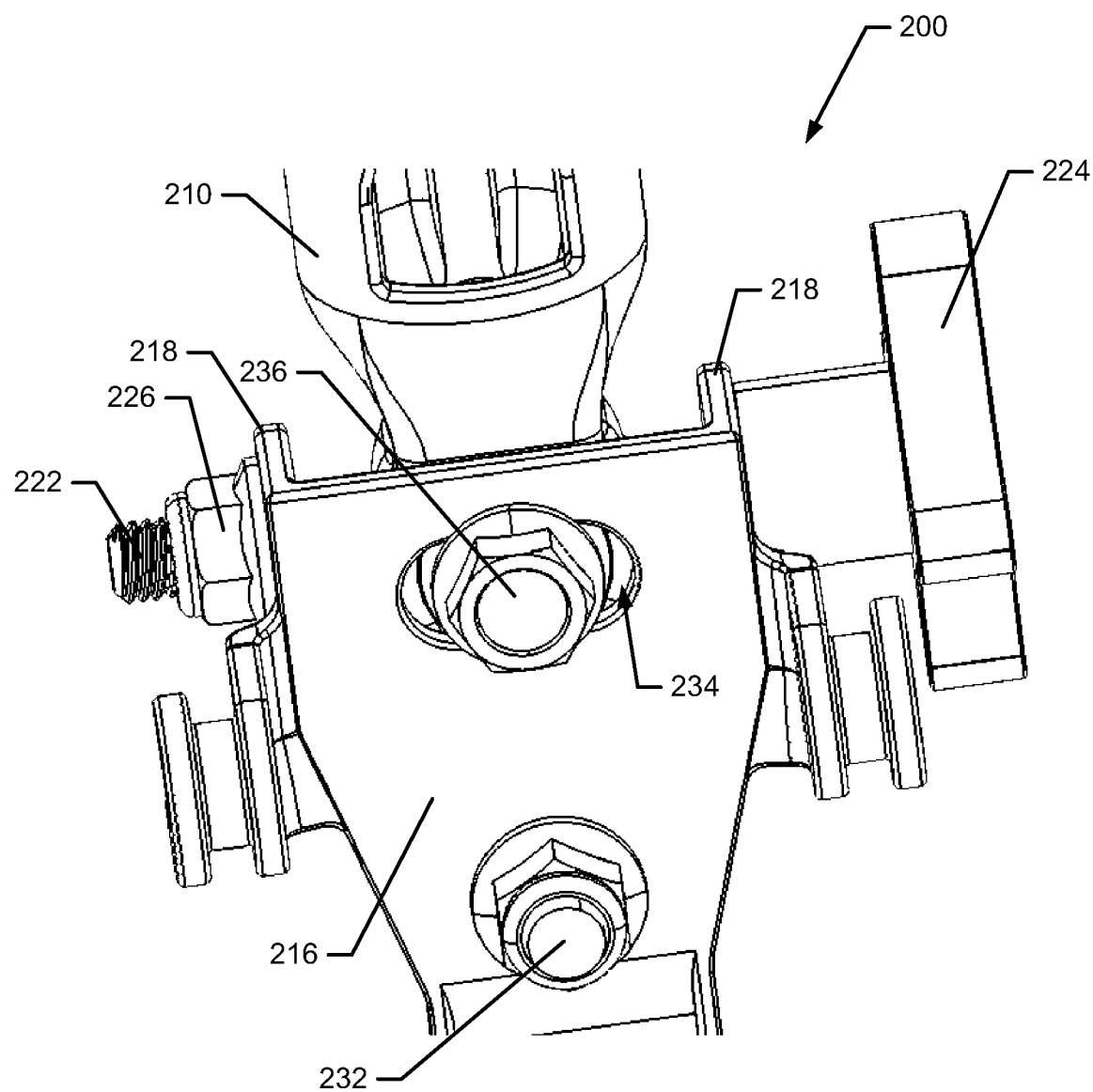
FIG. 8 illustrates a perspective view of the other side of the adjustment assembly of FIG. 7 in accordance with an example embodiment.

The adjustment assembly 200 could take a number of different forms. One such form is shown in the examples of FIGS. 4-10. In this regard, FIG. 4 illustrates a perspective view of the adjustment assembly 200 along with other components of the lever mount 80 in accordance with an example embodiment. FIGS. 5 and 6 illustrate opposing perspective views showing the adjustment assembly 200 in greater detail. Similarly, FIGS. 7 and 8 show opposing perspective views of the adjustment assembly 200 in isolation and in still greater detail. Meanwhile, FIGS. 9 and 10 are each cross section views of the adjustment assembly 200 with the sectioning plane of FIG. 9 bisecting a pivot block (along its longitudinal axis) of the adjustment assembly 200 and FIG. 10 bisecting an adjustment channel (again, along its longitudinal axis) of the adjustment assembly 200.

Referring now to FIGS. 4-10, the adjustment assembly 200 comprises a sleeve 210 that is operably coupled to a base portion 212 via a pivot coupling 214. Movement of the sleeve 210 relative to the base portion 212, and therefore adjustment of the pivot coupling 214, may be accomplished by rotation of a rotatable adjuster 220. The rotatable adjuster 220 comprises a threaded member (e.g., lead screw 222) that is operable via turning of a knob 224. A retaining nut 226 is provided at a distal end of the lead screw 222 to retain the rotatable adjuster 220 on the base portion 212.

The base portion 212 of the adjustment assembly 200 is operably coupled to a mount base 190 of the lever mount 80 via inboard/outboard pivot 192. As noted above, the steering levers 34 may be rotated outboard (shown by arrow 194) for applying a parking brake and/or for facilitating exit from the seat 20 for the operator. The steering levers 34 may also (when in the inboard position shown in FIG. 4) be pulled rearward or forward as shown by double arrow 196. When pivoted either forward or rearward, the lever mount 80 may also be biased to return back to a neutral position. Meanwhile, the adjustment assembly 200 may be used to locate the steering levers 34 in a desirable position for the user by enabling fine adjustment in the forward or rearward directions.

The base portion 212 may include a back plate 216, and opposing arms 218 that extend perpendicularly away from the back plate 216 and face each other to define an adjustment space therebetween. The pivot coupling 214 may be formed by passing a sleeve base 230 formed at a proximal end of the sleeve 210 (relative to the pivot coupling 214) between the arms 218 and operably coupling the sleeve base 230 to the back plate 216 at a pivot point 232. The pivot point 232 may be formed via a screw and nut combination, where the screw and nut combination rotatably retain the sleeve base 230 to the back plate 216 of the base portion 212 at the pivot point 232.

The back plate 216 may also include a movement limiting slot 234 formed spaced apart from the pivot point 232. A limit screw 236 may be operably coupled to a pivot block 240 of the adjustment assembly 200, and may be passed through the movement limiting slot 234. As described in greater detail below, the adjustment assembly 200 may be operated to adjust a position of the sleeve 210 about the pivot point 232 by operation of the rotatable adjuster 220. By doing so, the sleeve 210 may move from a first end of an operable range (where the limit screw 236 is at one end of the movement limiting slot 234 and the sleeve base 230 is closest to one of the arms 218) to a second end of the operable range (where the limit screw 236 is at the opposite end of the movement limiting slot 234 and the sleeve base 230 is closest to the other one of the arms 218). As can be appreciated from the description above, the pivot coupling 214 may be defined at least in part by the pivot point 232, the movement limiting slot 234 and the limit screw 236, along with the rotatable adjuster 220 and the interaction between the lead screw 222 thereof and the pivot block 240, which carries the sleeve base 230 along the lead screw 222 to reposition the sleeve base 230 relative to the base portion 212.

The pivot block 240 may be retained within the base portion 230 such that the pivot block 240 rotates or pivots therein responsive to operation of the rotatable adjuster 220. The pivot block 240 may include a threaded adjustment channel 250 passing therethrough. The pivot block 240 may be substantially cylindrical (or a hollow cylinder) with an axis that is coaxial with the limit screw 236. The axis of the pivot block 240 may be substantially perpendicular to the axis of the sleeve 210. The pivot channel 230 may extend substantially perpendicularly through the pivot block 240 relative to the axis of the pivot block 240 as well. The axis of the pivot channel 230 may also be substantially perpendicular to the axis of the sleeve 210. The pivot block 240 may be enabled to rotate or pivot within the base portion 230 as the rotatable adjuster 220 is turned or rotated. However, due to the threaded engagement between the lead screw 222 and adjustment channel 250, the rotation of the rotatable adjuster 220 will cause the pivot block 240 to be carried along a length of the lead screw 222 and thereby adjust the orientation of the sleeve 210 (and more particularly the sleeve base 230) relative to the base 212 (by pivoting the sleeve 210 about the pivot point 232).

In an example embodiment, rotation of the knob 224 in a first direction (shown by arrow 260 in FIGS. 5-7) will cause corresponding rotation of the lead screw 222 to draw the pivot block 240 toward the knob 224 in a direction shown by arrow 262 in FIGS. 5-7. Meanwhile, rotation of the knob 224 in a second direction (shown by arrow 264 in FIGS. 5-7) will cause corresponding rotation of the lead screw 222 to push the pivot block 240 away from the knob 224 in a direction shown by arrow 266 in FIGS. 5-7. The corresponding pivoting of the sleeve 210 will carry the corresponding steering lever 34 (which is inserted into the sleeve 210) accordingly either forward or rearward. The operator can therefore adjust the neutral position of each of the steering levers 34 using the corresponding adjustment assembly 200 on its side and obtain a comfortable setting (while also matching right and left sides exactly). Moreover, as noted above, the knob 224 could be replaced by an electric motor in some cases, and the electric motor may reposition the lead screw 222 by rotation in the directions shown in FIGS. 5-7.

Accordingly, some example embodiments may provide an adjustment assembly that may enable movement of a steering lever in a reverse (or forward) direction to alter a neutral position of the steering lever. In particular, some examples may employ one instance on each lever for a riding lawn care vehicle. The riding lawn care vehicle may include a frame to which at least a first drive wheel and a second drive wheel of the riding lawn care vehicle are attachable, a steering assembly and an adjustment assembly. The steering assembly may include a first steering lever and a second steering lever. The first and second steering levers may be operably coupled to the first and second drive wheels respectively to facilitate turning of the riding lawn care vehicle based on drive speed control of the first and second drive wheels responsive to positioning of the first and second steering levers along a first direction when the first and second steering levers are in an operating position. The adjustment assembly may provide for adjusting a position of one of the first or second steering levers. The adjustment assembly may include a sleeve operably coupled to one of the first steering lever or the second steering lever, a base portion operably coupled to the sleeve via a pivot coupling, and a rotatable adjuster. The pivot coupling may be configured to reposition the sleeve relative to the base portion along the forward and rearward directions responsive to operation of the rotatable adjuster to define non-discrete fixing relationships between the sleeve and the base portion along the forward and rearward directions.

The riding lawn care vehicle (or adjustment assembly) of some embodiments may include additional, optional features, and/or the features described above may be modified or augmented. Some examples of modifications, optional features and augmentations are described below. It should be appreciated that the modifications, optional features and augmentations listed below may each be added alone, or they may be added cumulatively in any desirable combination. For example, in some embodiments, the pivot coupling may include a pivot block disposed in a sleeve base of the sleeve. The pivot block may be pivotable with respect to the sleeve base responsive to operation of the rotatable adjuster. In an example embodiment, the pivot coupling may include a pivot point defining a point at which the sleeve pivots with respect to the base portion. The pivot coupling may include a movement limiting slot formed in the base portion, and a limit screw operably coupled to the pivot block. The limit screw may pass through the movement limiting slot to limit a range of movement of the sleeve base relative to the base portion. In some cases, the movement limiting slot may be formed in the base portion spaced apart from the pivot point. An axis of the pivot point may be substantially perpendicular to a longitudinal axis of the sleeve. In an example embodiment, the pivot block may define a threaded adjustment channel passing therethrough substantially perpendicular to an axis of the pivot block. In some cases, the rotatable adjuster comprises a knob and a lead screw, the lead screw may be in threaded engagement with the adjustment channel such that rotation of the rotatable adjuster carries the pivot block along the lead screw thereby adjusting a position of the sleeve base relative to the base portion. In an example embodiment, the base portion may include a back plate and arms extending substantially perpendicularly away from the back plate on opposing lateral sides of the back plate. The lead screw may pass through the arms, and adjusting the position of the sleeve base relative to the base portion may move the sleeve base closer to one of the arms and farther away from the other one of the arms. In some cases, the pivot coupling may include a pivot block disposed in a sleeve base of the sleeve, and the pivot block may have an axis about which the pivot block rotates or pivots within the sleeve base. The axis may be substantially perpendicular to a direction of lateral movement of the pivot block responsive to rotation of the rotatable adjuster. In an example embodiment, the rotatable adjuster may be adjustable by an operator without tools. In some cases, the adjustment assembly may include a first adjustment assembly for adjusting a position of the first steering lever, and a second adjustment assembly for adjusting a position of the second steering lever. In an example embodiment, the riding lawn care vehicle may be a zero-turn radius lawn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. An adjustment assembly for adjusting a position of one of a pair of steering levers of a riding lawn care vehicle, wherein the riding lawn care vehicle comprises first and second drive wheels, and the steering levers are operably coupled to respective ones of the first and second drive wheels to selectively control the riding lawn care vehicle based on drive speed control of the first and second drive wheels responsive to positioning of the steering levers along forward and rearward directions, the adjustment assembly comprising:

a sleeve operably coupled to one of the steering levers;
a base portion operably coupled to the sleeve via a pivot coupling; and
a rotatable adjuster,
wherein the pivot coupling is configured to reposition the sleeve relative to the base portion along the forward and rearward directions responsive to operation of the rotatable adjuster to define non-discrete fixing relationships between the sleeve and the base portion along the forward and rearward directions.

2. The adjustment assembly of claim 1, wherein the pivot coupling comprises a pivot block disposed in a sleeve base of the sleeve, the pivot block being pivotable with respect to the sleeve base responsive to operation of the rotatable adjuster.

3. The adjustment assembly of claim 2, wherein the pivot coupling comprises a pivot point defining a point at which the sleeve pivots with respect to the base portion,
wherein the pivot coupling comprises a movement limiting slot formed in the base portion, and a limit screw operably coupled to the pivot block, and
wherein the limit screw passes through the movement limiting slot to limit a range of movement of the sleeve base relative to the base portion.

4. The adjustment assembly of claim 3, wherein the movement limiting slot is formed in the base portion spaced apart from the pivot point, and
wherein an axis of the pivot point is substantially perpendicular to a longitudinal axis of the sleeve.

5. The adjustment assembly of claim 2, wherein the pivot block defines a threaded adjustment channel passing therethrough substantially perpendicular to an axis of the pivot block.

6. The adjustment assembly of claim 5, wherein the rotatable adjuster comprises a knob and a lead screw, and
wherein the lead screw is in threaded engagement with the adjustment channel such that rotation of the rotatable adjuster carries the pivot block along the lead screw thereby adjusting a position of the sleeve base relative to the base portion.

7. The adjustment assembly of claim 6, wherein the base portion comprises a back plate and arms extending substantially perpendicularly away from the back plate on opposing lateral sides of the back plate,
wherein the lead screw passes through the arms, and
wherein adjusting the position of the sleeve base relative to the base portion moves the sleeve base closer to one of the arms and farther away from the other one of the arms.

8. The adjustment assembly of claim 1, wherein the pivot coupling comprises a pivot block disposed in a sleeve base of the sleeve, the pivot block has an axis about which the pivot block rotates or pivots within the sleeve base, wherein the axis is substantially perpendicular to a direction of lateral movement of the pivot block responsive to rotation of the rotatable adjuster.

9. The adjustment assembly of claim 1, wherein the rotatable adjuster is adjustable by an operator without tools.

10. A riding lawn care vehicle comprising:
a frame to which at least a first drive wheel and a second drive wheel of the riding lawn care vehicle are attachable;
a steering assembly comprising a first steering lever and a second steering lever, wherein the first and second steering levers are operably coupled to the first and second drive wheels respectively to facilitate turning of the riding lawn care vehicle based on drive speed control of the first and second drive wheels responsive to positioning of the first and second steering levers along a first direction when the first and second steering levers are in an operating position; and
an adjustment assembly for adjusting a position of one of the first or second steering levers,
wherein the adjustment assembly comprises:
a sleeve operably coupled to one of the first steering lever or the second steering lever;
a base portion operably coupled to the sleeve via a pivot coupling; and
a rotatable adjuster,
wherein the pivot coupling is configured to reposition the sleeve relative to the base portion along the forward and rearward directions responsive to operation of the rotatable adjuster to define non-discrete fixing relationships between the sleeve and the base portion along the forward and rearward directions.

11. The riding lawn care vehicle of claim 10, wherein the pivot coupling comprises a pivot block disposed in a sleeve base of the sleeve, the pivot block being pivotable with respect to the sleeve base responsive to operation of the rotatable adjuster.

12. The riding lawn care vehicle of claim 11, wherein the pivot coupling comprises a pivot point defining a point at which the sleeve pivots with respect to the base portion,
wherein the pivot coupling comprises a movement limiting slot formed in the base portion, and a limit screw operably coupled to the pivot block, and
wherein the limit screw passes through the movement limiting slot to limit a range of movement of the sleeve base relative to the base portion.

13. The riding lawn care vehicle of claim 12, wherein the movement limiting slot is formed in the base portion spaced apart from the pivot point, and
wherein an axis of the pivot point is substantially perpendicular to a longitudinal axis of the sleeve.

14. The riding lawn care vehicle of claim 11, wherein the pivot block defines a threaded adjustment channel passing therethrough substantially perpendicular to an axis of the pivot block.

15. The riding lawn care vehicle of claim 14, wherein the rotatable adjuster comprises a knob and a lead screw, and
wherein the lead screw is in threaded engagement with the adjustment channel such that rotation of the rotatable adjuster carries the pivot block along the lead screw thereby adjusting a position of the sleeve base relative to the base portion.

16. The riding lawn care vehicle of claim 15, wherein the base portion comprises a back plate and arms extending substantially perpendicularly away from the back plate on opposing lateral sides of the back plate,
wherein the lead screw passes through the arms, and
wherein adjusting the position of the sleeve base relative to the base portion moves the sleeve base closer to one of the arms and farther away from the other one of the arms.

17. The riding lawn care vehicle of claim 10, wherein the pivot coupling comprises a pivot block disposed in a sleeve base of the sleeve, the pivot block has an axis about which the pivot block rotates or pivots within the sleeve base,
wherein the axis is substantially perpendicular to a direction of lateral movement of the pivot block responsive to rotation of the rotatable adjuster.

18. The riding lawn care vehicle of claim 10, wherein the rotatable adjuster is adjustable by an operator without tools.

19. The riding lawn care vehicle of claim 10, wherein the adjustment assembly comprises a first adjustment assembly for adjusting a position of the first steering lever, and a second adjustment assembly for adjusting a position of the second steering lever.

20. The riding lawn care vehicle of claim 10, wherein the riding lawn care vehicle is a zero-turn radius lawn mower.

* * * * *